United States Patent [19]

Young

[11] 3,731,856
[45] May 8, 1973

[54] LIQUID METERING DEVICE WITH TIME DELAYED CLOSURE

[75] Inventor: Robert William Young, Battledown, England

[73] Assignee: Autic Developments Limited, Cheltenham, England

[22] Filed: Jan. 3, 1972

[21] Appl. No.: 214,966

[30] Foreign Application Priority Data

Nov. 1, 1971 Great Britain.....................50,645/71

[52] U.S. Cl..................................222/477, 222/499
[51] Int. Cl. ............................................B65d 47/28
[58] Field of Search......................222/453, 477, 499, 222/553, 70

[56] References Cited

UNITED STATES PATENTS 3,107,821 10/1963 Lambert..........................222/477 X
3,460,723 8/1969 Young................................222/453

Primary Examiner—Robert B. Reeves
Assistant Examiner—David A. Scherbel
Attorney—Irvin S. Thompson et al.

[57] ABSTRACT

A liquid measure includes a change-over valve and an interlock mechanism including a bellows and an over-centre spring acting to provide a time delay between change-over operations of the valve. Cam means are provided whereby movement of a part of the interlock mechanism is not transmitted to the over-centre spring until a change-over condition is reached.

6 Claims, 2 Drawing Figures

LIQUID METERING DEVICE WITH TIME DELAYED CLOSURE

BACKGROUND OF THE INVENTION

1. Field of the Invention

The invention relates to liquid measures of the kind which include a change-over valve and an interlock mechanism acting to provide a time delay between change-over operations of the valve.

2. Description of the Prior Art

In Specification No. 3,460,723 there is disclosed a liquid measure having a measuring chamber, a normally open inlet valve and normally closed outlet valve for the chamber provided by respective ends of a common vlave member, a dispensing member which is operable to change over the valve member and dispense the measured quantity of liquid contained in the chamber, and an interlock mechanism which includes a time delay device and is operative to prevent reverse change-over of the valve member after a dispensing operation until an adequate delay has elapsed for the chamber to drain completely and to prevent another operative movement of the dispensing member with attendant change-over of the valve member until a further delay has elapsed adequate to allow the chamber to refill, the valve member being changed over by a toggle mechanism which employs an over-centre spring and is controlled by the interlock mechanism.

It has been found that, in a measure as set out above, an increase in pressure within a bottle connected to the measure may cause movement of the valve member of the "inlet valve closed" position against the action of the over-centre spring immediately prior to a change-over operation of the spring with consequent flow of liquid into the measuring chamber. An object of the invention is accordingly to overcome the above disadvantage of the measure of U.S. Pat. specification No. 3,460,723.

SUMMARY OF THE INVENTION

The invention consists in the provision of means whereby, during movement of a part of the interlock mechanism, such movement is not transmitted to the over-centre spring until said part is at a position corresponding to movement of the valve member out of the "inlet valve closed" position.

DESCRIPTION OF THE PREFERRED EMBODIMENT

Figure 1:
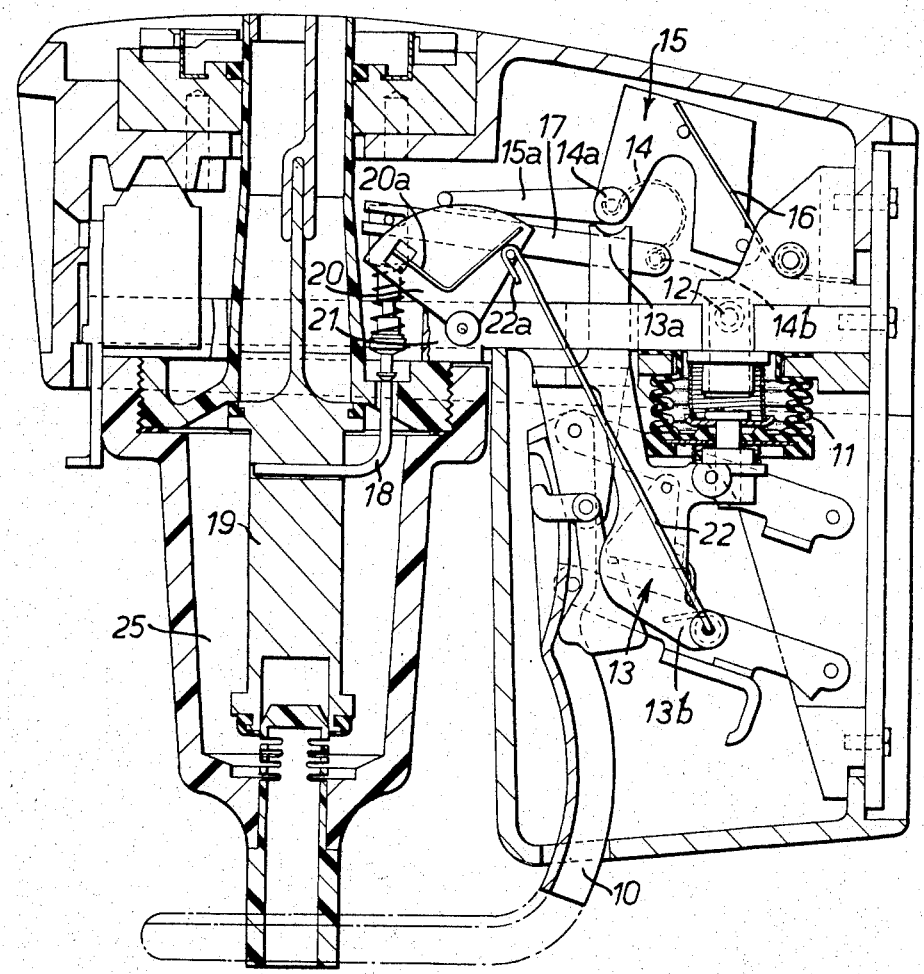
FIG. 1 is a sectional view of the measure in the condition obtaining immediately after the dispensing member has been operated to effect a dispensing operation, the common valve closure member within the measuring chamber being shown in its "inlet valve closed" position

The measure of the present invention is a modification of that shown in specification No. 3,460,723 and includes a large number of operating parts in common with the measure of U.S. Pat. specification No. 3,460,723. Reference should accordingly be made to said specification for full details of the mode of operation of the various parts of the measure, the particular description herein contained being principally concerned with a discussion of the modifications which have been used to the measure of said specification.

As shown in the drawings the measure includes a manually operable dispensing member 10 operation of which results in compression of a bellows 11 having a controllable bleed valve 12 and upward movement of an interlock lever 13. The upper end portion 13a of the interlock lever is arranged for cooperation with a mounting pin 14a for one end of an over-centre spring 14. Mounting pin 14a is fixed relative to a driving lever 15 acted on by a return spring 16 and a mounting pin 14b for the other end of the spring 14 is fixed to a driven lever 17 connected to a link 18 attached to the common valve closure member 19.

A cam 20 is pivotally mounted on a fixed part 21 of the measure and carries a leaf spring 20a which engages a hook formation 22a of a link 22 extending between the cam 20 and the lower end portion 13b of the interlock lever 13. The hook formation 22a engages over a projecting pin on the cam 20 and the leaf spring 20a acts to bias the hook formation 22a into engagement with the pin but allows the link 22 to move relative to the cam against the biassing action of the spring.

An extension 15a of the driving lever 15 has a transversely projecting end portion 23 which acts as a cam follower and engages the outer surface of the cam 20.

Figure 2:
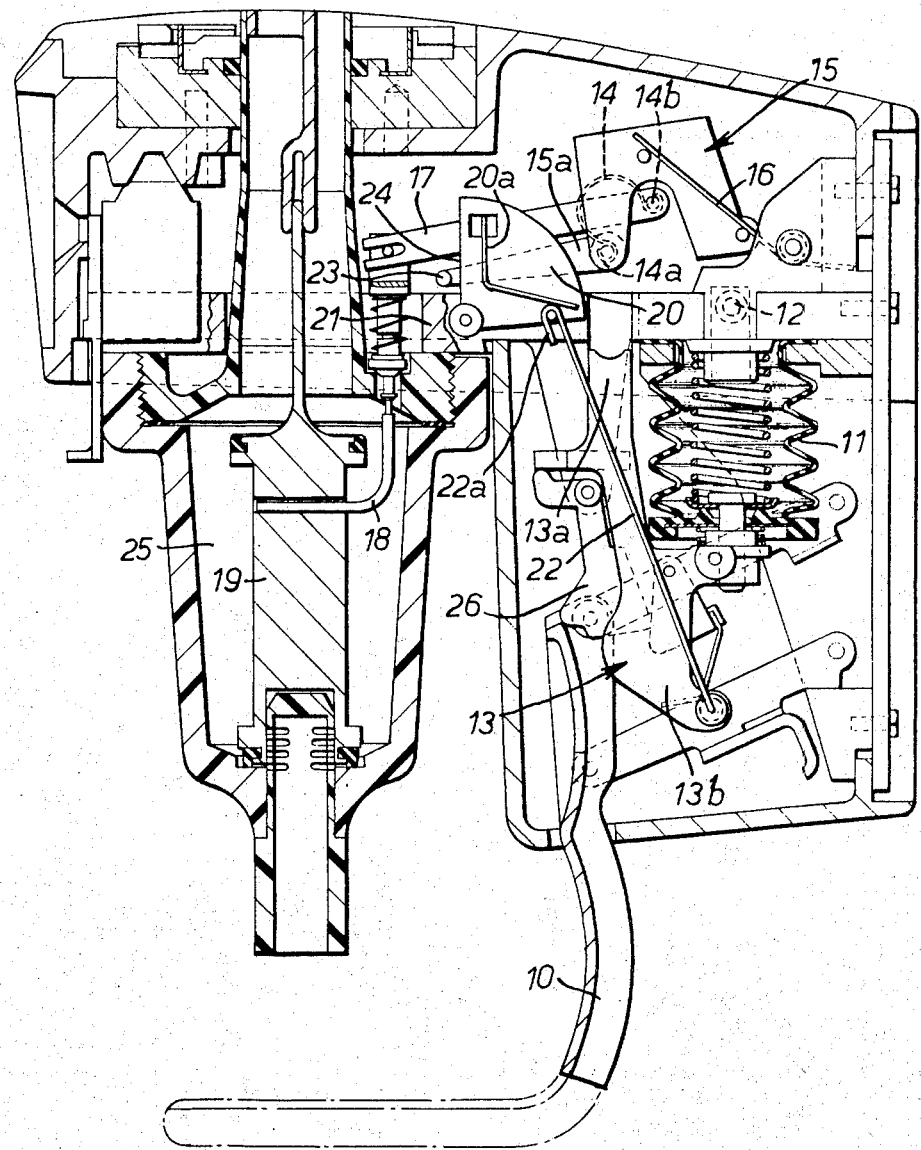
FIG. 2 is a sectional view of the measure after completion of a dispensing operation, the common valve closure member being shown in its "outlet valve closed" position.

In the inoperative condition the various parts of the measure are in the positions shown in FIG. 2. When the dispensing member 10 is moved it serves, through operation of the associated linkage system, to compress the bellows 11 and move the interlock lever upwardly.

Such upward movement of the interlock lever 13 results in corresponding movement of the link 22 which initially moves the cam 20 about its pivot axis until the end face 24 of the cam 20 abuts the transverse end portion 23 of the driving lever 15. The hook formation 22a then moves over the pin projecting from the cam 20, the lost-motion connection between the cam and link being afforded by the leaf spring 20a.

During such movement of the link 22 the upper end portion of the interlock lever 13 engages the mounting pin 14a to displace this and the driving lever 15 upwardly so that the transverse portion 23 moves along the end face 24 and moves clear thereof. Upon predetermined movement of the mounting pin 14a, the over-centre spring reaches its change-over condition and changes from the configuration shown in FIG. 1 to the configuration shown in FIG. 2.

The driven lever 17 is pivoted about its midpoint and, as a result of movement of the change-over of the spring 14, mounting pin 14b moves from the position shown in FIG. 1 to the position shown in FIG. 2 to effect pivotal movement of the lever 17 and thus, as described in U.S. Pat. specification No. 3,460,723, movement of the valve closure member 19 from the "outlet valve closed" position of FIG. 2.

Such upward movement of the interlock lever 13 has compressed the bellows 11 which contains a return spring and has also been against the action of the return spring 16 acting on the driving lever 15.

As soon as the applied manual pressure on the dispensing member 10 is released the bellows 11 will tend to expand at a rate depending on the setting of the air bleed valve 12. Such expansion of the bellows will move the interlock lever 13 downwardly so that the upper end portion 13a of the lever moves out of engagement with the spring mounting pin 14a. The spring mounting pin 14a which is mounted on the driving lever 15 will not however move down at this time because the transverse portion 23 of the lever 15 is resting on the upper surface of the cam 20. The link 22 coupled to the lower end portion 13b of the lever 13 moves with progressive expansion of the bellows 11 so as to pivot the cam 20 until the upper surface of the cam 20 no longer supports the transverse portion 23. The transverse portion 23 will then move rapidly along end face 24 of the cam with consequent pivotal movement of the driving lever 15 and downward movement of the mounting pin 14a carried on the driving lever. The over-centre spring 14 will thus reach its change-over condition on such movement of the mounting pin 14a into re-engagement with the upper end portion of the interlock lever 13 and change-over of the spring 14 will cause pivotal movement of the driven lever 17 and consequent return of the valve closure member to its "outlet valve closed" position.

When the valve member 19 is in its "outlet valve closed" position as shown in FIG. 2, the chamber 25 refills from a bottle (not shown) connected to the measure. The valve member cannot, however, be returned to its "inlet valve closed" position until sufficient time has elapsed to allow refilling of the chamber. The interlock means preventing such repeated operation of the valve member 19 is as described in U.S. Pat. Specification No. 3,460,723 and includes a link 26 pivotally connected to the bellows 11.

I claim:

1. In a liquid measure having a measuring chamber, a normally open inlet valve and a noramlly closed outlet valve for the chamber provided by respective ends of a common valve member, a dispensing member which is operable to change over the valve member and dispense the measured quantity of liquid contained in the chamber, and an interlock mechanism which includes a time delay device and is operative to prevent reverse change-over of the valve member after a dispensing operation until an adequate delay has elapsed for the chamber to drain completely and to prevent another operative movement of the dispensing member with attendant change-over of the valve member until a further delay has elapsed adequate to allow the chamber to refill, the valve member being changed over by means including an over-centre spring and controlled by the interlock mechanism, the improvement which comprises means whereby, during movement of a part of the interlock mechanism into a position corresponding to movement of the common valve member out of the "inlet valve closed" position, such movement is not transmitted to the over-centre spring until said part is at said position.

2. A measure according to claim 1, wherein the time delay device includes a bellows and an interlock lever is connected to the bellows in such way that, during expansion of the bellows, an upper end portion of the lever, which engages a mounting means for one end of the over-centre spring during compression of the bellows, moves downwardly out of engagement with said mounting means.

3. A measure according to claim 2, wherein cam mmeans are associated with the mounting means for said one end of the over-centre spring.

4. A measure according to claim 3, wherein said cam means operates, during expansion of the bellows, to hold the mounting means against movement with said upper end portion of the interlock lever until the bellows has expanded a predetermined amount whereupon the cam means operates to release the mounting means for movement into engagement with said upper end portion to allow a change-over operation of the over-centre spring to move the common valve member from its "inlet valve closed" position to its outlet valve closed" position.

5. A measure according to claim 4, wherein the cam means comprises a cam pivotally mounted on a fixed part of the measure and a cam follower attached to the mounting means and arranged for engagement with the cam.

6. A measure according to claim 5, wherein a lost-motion linkage extends between the cam and the lower end portion of the interlock lever for effecting controlled pivotal movement of the cam during expansion of the bellows.

* * * * *